United States Patent [19]

Rothenbuehler et al.

[11] Patent Number: 5,125,616
[45] Date of Patent: Jun. 30, 1992

[54] STOP FOR CONCRETE FORMWORK

[75] Inventors: Walter Rothenbuehler, Gams, Switzerland; Josef Schmidle, Göfis, Austria

[73] Assignee: Hilti Aktiengesellschaft, Fürstentum, Liechtenstein

[21] Appl. No.: 587,238

[22] Filed: Sep. 24, 1990

[30] Foreign Application Priority Data

Sep. 23, 1989 [DE] Fed. Rep. of Germany ....... 3931831

[51] Int. Cl.⁵ .............................................. B29C 33/12
[52] U.S. Cl. ................................... 249/3; 249/9;
249/19; 249/177; 411/441; 411/533; 411/544; 411/908
[58] Field of Search ............. 249/3, 9, 19, 34, 176, 249/177, 208, 210, 219.1; 411/441, 531, 533, 544, 908; 52/512

[56] References Cited

U.S. PATENT DOCUMENTS

| 2,092,684 | 9/1937 | Uhl | 411/531 |
|---|---|---|---|
| 2,614,310 | 10/1952 | James | 249/176 |
| 3,469,817 | 9/1969 | Bowden et al. | 249/177 |
| 4,077,599 | 3/1978 | Oland | 249/177 |
| 4,289,060 | 9/1981 | Emmett | 411/544 |
| 4,669,169 | 6/1987 | Hogg | 411/441 |
| 4,799,845 | 1/1989 | Hrysko | 411/544 |
| 4,802,802 | 2/1989 | Thurner | 411/441 |
| 4,915,561 | 4/1990 | Buhri et al. | 411/441 |

FOREIGN PATENT DOCUMENTS

| 3009672 | 9/1980 | Fed. Rep. of Germany . | |
| 161398 | 11/1957 | Sweden | 411/544 |

Primary Examiner—Tim Heitbrink
Attorney, Agent, or Firm—Akoo-Toren

[57] ABSTRACT

A stop (1) for supporting a side of concrete form work (12) includes a deformable section (2) in the form of a collapsible sleeve (2) with an abutment (8). The sleeve is formed monolithically with the stop. A nail (13) with a head (13a) secures the stop (1) to a concrete structure or component (11) and when the nail (13) is driven its head (13a) runs up against the abutment (8). If energy in excess of the amount needed to drive the nail (13) in is present, the nail head (13a) striking the abutment (8) axially collapses the sleeve and damage to the stop (1) is avoided.

8 Claims, 1 Drawing Sheet

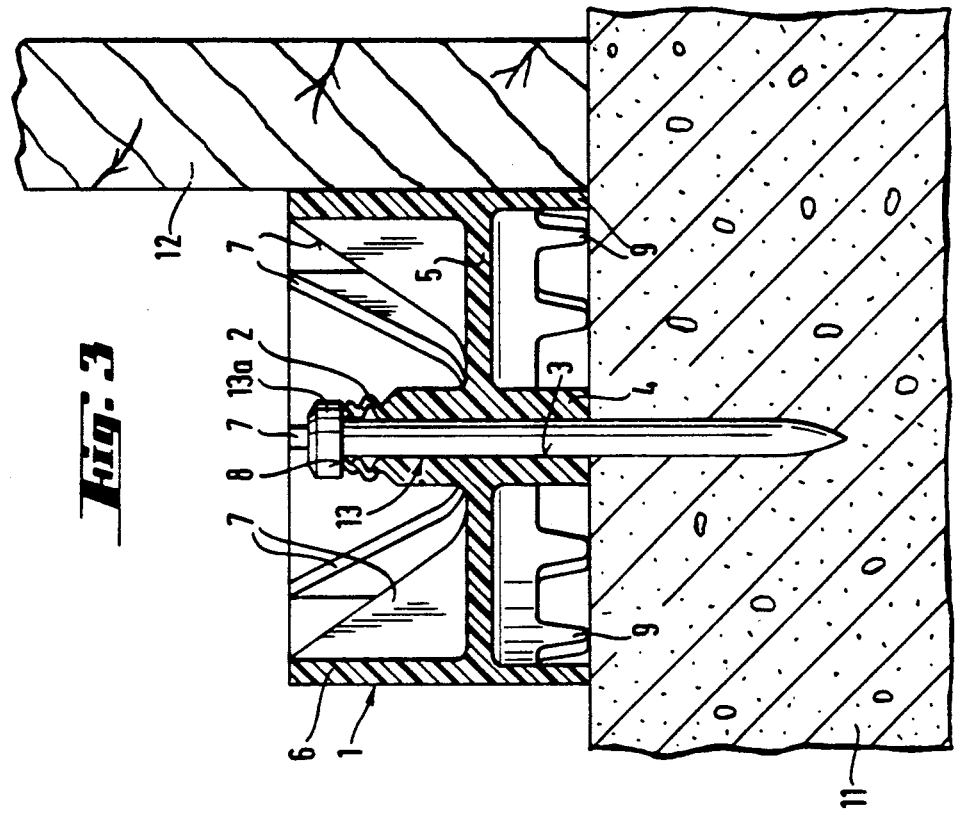
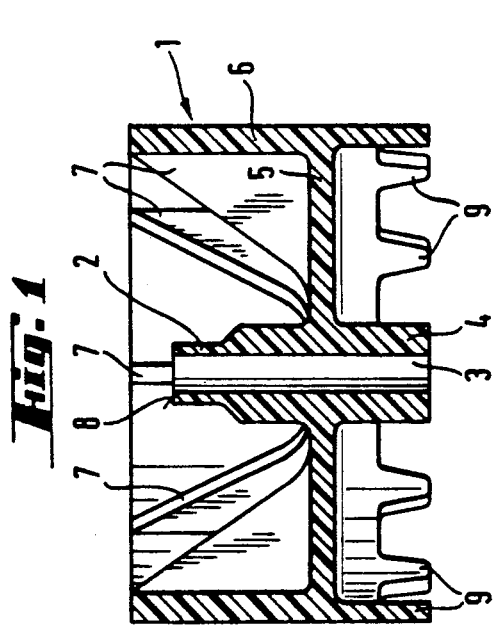
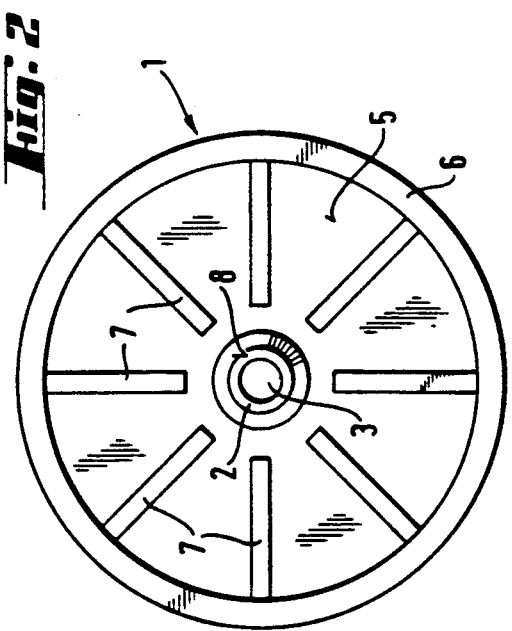

STOP FOR CONCRETE FORMWORK

BACKGROUND OF THE INVENTION

The invention is directed to a stop for securing concrete formwork in position. The stop contains a passageway with an abutment at one end. A nail is used to secure the stop in position and, when driven through the passageway, the nail contacts the abutment. The passageway includes an axially extending deformable section located between the abutment and the connection of the passageway to the stop.

A stop is disclosed in DE-A 30 009 672 and is used as a side support for concrete formwork and is fastened to a component by means of a nail. A passageway and an abutment are provided for the nail and a deformable section is located between the abutment and the stop. The deformable section acts as a shock absorber and prevents damage to the stop.

The deformable section is constructed as a ring displaceably seated on the nail with on side of the ring serving as the abutment. The ring must be placed on the nail before the nail is introduced into the passageway through the stop, and this arrangement has proven to be cumbersome. Further, there is the danger that placement of the ring on the nail may be forgotten. A disadvantage of this known assembly is primarily that the ring ruptures radially when the nail is driven and falls off the nail shank. As a result, the support of the stop by the nail is lost.

SUMMARY OF THE INVENTION

Therefore, the primary object of the present invention is to provide a stop including an abutment and a deformable section assuring simple handling and secure attachment of the stop.

In accordance with the present invention, the deformable section is formed as an axially collapsible sleeve constructed monolithically with the stop.

Due to its unitary formation with the stop, the collapsible sleeve can not fall off even if radial rupture occurs, so that a secure attachment of the stop is assured.

If the stop is made of a plastics material, the unitary construction can be effected preferably by extruding or injection molding the collapsible sleeve directly to the stop The collapsible sleeve joined in this way with the stop is available so that after the stop is placed against a component or structure, it is only necessary to drive the nail through the passageway including the collapsible sleeve into the component. If the nail is driven by an explosive powder charge operated setting tool, the tool can support itself with its barrel at the collapsible sleeve which affords advantages especially for handling or manipulation. The deformable section is preferably formed as a sleeve. The sleeve can extend from a support on the stop facing toward the abutment. If the nail is driven through the sleeve into the component or structure with excess energy, the excess energy axially deforms or collapses the sleeve.

Preferably, the free end of the sleeve is offset inwardly relative to the outer end surface of the stop. This assures that the nail, as driven in, does not project axially outwardly from the stop. With such an arrangement any contact of the concrete formwork with the nail is avoided when the formwork is moved toward the stop, since contact between formwork and the nail could impair the anchorage of the nail in the component.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an axial section of a stop embodying the present invention;

FIG. 2 is a plan view of the stop illustrated in FIG. 1; and

FIG. 3 is a view of the stop similar to FIG. 1 with the stop secured to a component or structure by means of a nail.

DETAILED DESCRIPTION OF THE INVENTION

Stop 1 is formed of a plastics material and includes a sleeve 2 serving as a deformable section with the stop and sleeve forming a monolithically constructed unit. Stop 1 and sleeve 2 define an axially extending passageway 3. Sleeve 2 extends axially upwardly or outwardly from a hub-like inner part 4 of the stop. An annular base part 5 extends transversely of and is spaced from the ends of the inner part 4. Base part 5 extends radially outwardly from inner part 4 to a hollow cylindrical jacket 6. Ribs 7, note FIGS. 1, 2 and 3, are located on the upper side of the base part 5 and extend radially outwardly from adjacent the inner part 4 to the inner surface of the jacket 6. Relative to the axis of the passageway 3, the ribs 7 slope outwardly from the base part 5 to the upper end of the jacket 6.

The upper or free end of the sleeve 2 forms an abutment 8 and is offset axially from the upper end of the jacket 6 by approximately the dimension of the diameter of the sleeve 2. The lower end of the jacket 6 as viewed in FIGS. 1 and 3, that is, the end bearing against the component or structure 11 is constructed of a plurality of support fingers 9 spaced apart around the circumference of the jacket 6.

As shown in FIG. 3, stop 1 is fastened to the structure or component 11 constructed of concrete to form a side support for concrete form work 12. Support fingers 9 around the lower end of the stop 1 assure a stable abutment against the surface of the component 11 even if such surface is uneven. A nail 13 is driven through the passageway 3 into the component for securing the stop 1 to the component 11. Preferably, the nail 13 is driven by an explosive powder charge operated setting tool. Depending on the strength of the component 11 in the region in which the nail 13 is driven in, the depth of penetration of the nails 13 varies from attaching location to attaching location. Depending on the depth of penetration of the nail 13, its head 13a contacts the abutment 8 toward the end of the driving operation and displaces the abutment 8 in the driving direction, whereby the sleeve 2 is axially collapsed as shown in FIG. 3. The extent of such collapse depends on the amount of excess driving energy available after the nail head 13 contact the abutment 8. The head 13a remains in contact with the abutment 8, so that the stop 1 is held against the structure or component 11 by means of the collapsed sleeve 2 connected to the inner part 4 of the stop 1. The collapse of the sleeve 2 dissipates any excess energy imparted to the nail 13.

While specific embodiments of the invention have been shown and described in detail to illustrate the application of the inventive principles, it will be understood that the invention may be embodied otherwise without departing from such principles.

We claim:

1. A stop (1) for concrete formwork (12) having a first end face spaced from a second end face and first direction extending from the first end face to the second end face, said stop (1) includes a passageway (3) extending in the first direction and having a first end and a second end extending transversely of the first direction with said first end located closer to the first end face of said stop (1) and forming an abutment (8), wherein the improvement comprises that said passageway (3) includes a tubular deformable section (2) extending in the first direction from said abutment (8), means forming an outer part laterally enclosing and spaced outwardly from said passageway, said deformable section (2) is formed monolithically with said means and said deformable section is deformable independently of said means.

2. A stop, as set forth in claim 1, wherein said deformable section (2) is an axially extending sleeve.

3. A stop, as set forth in claim 2, wherein said sleeve (2) has a free end forming said abutment (8) and located between the first end face and the second end face of said stop (1).

4. A stop, (1) for concrete formwork (12), said stop (1) having a first end face spaced from a second end face and a first direction extending from the first end face to the second end face, said stop (1) includes a passageway (3) extending in the first direction and having a first end and a second end extending transversely of the first direction with said first end located closer to the first end face of said stop (1) and forming an abutment (8), wherein the improvement comprises that said passageway (3) includes a deformable section (2) extending in the first direction from said abutment (8), and said deformable section (2) is formed monolithically with said stop (1), said stop (1) comprises a jacket (6) extending in the first direction and spaced radially outwardly from said passageway (3), an annular base (5) extending transversely of the first direction between said passageway (3) and said jacket (6), and said passageway (3) comprising a hub-like inner part (4) extending in the first direction and said inner part (4) having a first end closer to the first end of said stop (1) and a second end closer to the second end of said stop (1), and said deformable section (2) extending from the first end of said inner part (4) toward and spaced from the first end of said stop (1).

5. A stop, as set forth in claim 4, wherein ribs (7) extend in the first direction from said base (5) to the first end of said jacket (6), said ribs (7) are located within said jacket (6) and extend radially outwardly from adjacent said inner part (4) to said jacket (6)

6. A stop, as set forth in claim 5, wherein said ribs (7) are inclined from said base (5) outwardly to the first end of said jacket (6).

7. A stop, as set forth in claim 4, wherein said inner part has an inside diameter and an outside diameter, said deformable section (2) is a collapsible sleeve (2) having an inside diameter substantially equal to the inside diameter of said inner part (4) and an outside diameter substantially smaller than the outside diameter of said inner part (4).

8. A stop, as set forth in claim 4, wherein the second end of said jacket (6) comprises a plurality of support fingers (9) extending in the first direction and spaced circumferentially apart, said support fingers (9) extends from the second end of said stop (1) toward and spaced from said base (5).

* * * * *